W. TURNER.
Hoisting-Apparatus.
No. 168,196.             Patented Sept. 28, 1875.
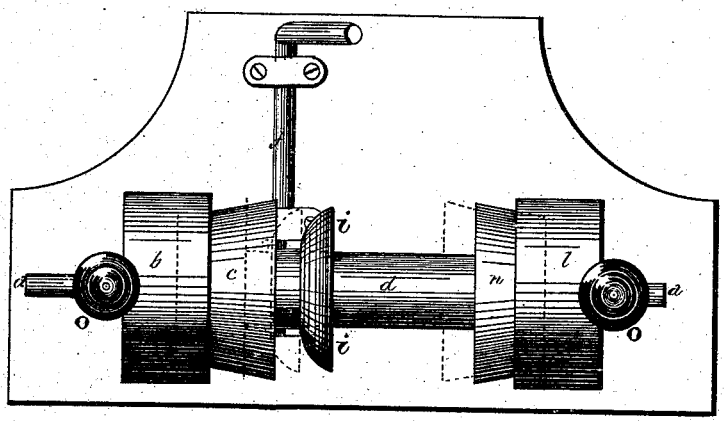
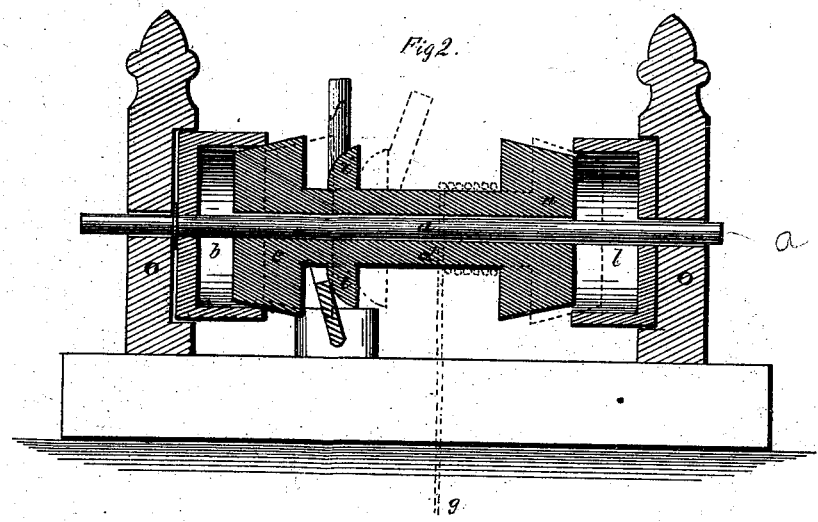

UNITED STATES PATENT OFFICE.

WILLIAM TURNER, OF MILLERSTOWN, PENNSYLVANIA.

IMPROVEMENT IN HOISTING APPARATUS.

Specification forming part of Letters Patent No. 168,196, dated September 28, 1875; application filed March 19, 1875.

*To all whom it may concern:*

Be it known that I, WILLIAM TURNER, of Millerstown, in the county of Butler and State of Pennsylvania, have invented certain new and useful Improvement in Hoisting Apparatus; and I do hereby declare the following to be a full, clear, and exact description of the invention, such as will enable others skilled in the art to which it pertains to make and use it, reference being had to the accompanying drawings, which form part of this specification.

My invention relates to an improvement in hoisting-machines; and it consists in the arrangement and combination of parts that will be more fully described hereafter, whereby a simple, cheap, and efficient machine is produced.

Figure 1 is a plan view of my machine. Fig. 2 is a longitudinal vertical section of the same.

$a$ represents the driving-shaft, having its bearings in the two uprights $o$, and to which is rigidly secured the pulley $b$, so that the pulley and shaft will always revolve in the same direction. Placed loosely on the shaft, so that it can be shifted back and forth by the lever $f$, is the windlass $d$, upon which the rope $g$ is wound and unwound. Upon each end of this windlass is formed a conical clutch, $c$ $n$, that fits into the recessed ends of the pulley $b$ secured to the shaft, and the recessed block $l$ that is rigidly fastened to one of the uprights $o$. Upon the windlass or drum $d$, at a slight distance from the clutch $c$, is formed a flange, $i$, which serves both as a guide or check for the rope in winding up, and as a surface against which the forked end of the lever $f$ bears, so as to move the drum toward the block $l$. When the drum is moved so that the clutch $c$ is pressed into the pulley $b$ the frictional contact of the two parts causes the drum to revolve with the pulley, and thus wind up the rope. After the weight has been raised, and it is desired to lower it again, the drum is moved away from the pulley and the clutch $n$ forced into the recessed block $l$ with sufficient force to cause enough friction to regulate the revolving of the drum to any desired extent. Where the pressure is such as to cause only a slight friction the weight will revolve the drum rapidly, but where the friction is great the weight can be lowered very slowly or held suspended at any desired point. Thus at any moment, by simply changing the position of the lever, a weight suspended by the rope $g$, whether going up or down, may be arrested in its course. The pulley $b$ is driven by a belt from any suitable point.

I am aware that a double-ended clutch, for changing the speed and power of two shafts, is old, and this I disclaim. My invention relates wholly to hoisting-machines, and consists in a single pulley that is keyed to the shaft, and a fixed frictional block for controlling the unwinding of the rope while the weight is being lowered.

Having thus described my invention, I claim—

In a hoisting-machine the combination of the shaft $a$ and pulley $b$ attached thereto, in combination with the windlass or drum $d$, having the conical clutches $c$ $n$ on its ends, recessed block $l$ rigidly fastened to a frame or upright, $o$, and shifting-lever $f$ for moving the drum back and forth on the shaft, substantially as shown and described.

In testimony that I claim the foregoing I have hereunto set my hand this 12th day of March, 1875.

WILLIAM TURNER.

Witnesses:
 J. W. GRAY,
 F. M. SMALL.